United States Patent [19]

Le Mehaute et al.

[11] 4,381,258

[45] Apr. 26, 1983

[54] ELECTRONIC CELL WITH A NON-AQUEOUS ELECTROLYTE

[75] Inventors: Alain Le Mehaute, Gif sur Yvette; Jean Rouxel, Nantes; Annie Le Blanc-Soreau, La Chapelle sur Erdre, all of France

[73] Assignee: Societe Anonyme dite Compagnie Generale d'Electricite, Paris, France

[21] Appl. No.: 321,074

[22] Filed: Nov. 13, 1981

Related U.S. Application Data

[62] Division of Ser. No. 175,327, Aug. 4, 1980.

[30] Foreign Application Priority Data

Sep. 11, 1979 [FR] France ............................. 79 22643

[51] Int. Cl.$^3$ ............................................. H01B 1/06
[52] U.S. Cl. .................................... 252/519; 252/518; 252/182.1; 429/194; 429/197; 429/218
[58] Field of Search ................. 252/518, 519, 182.1; 429/194, 197, 218; 29/623.1, 623.5; 141/1.1

[56] References Cited

U.S. PATENT DOCUMENTS

| | | | |
|---|---|---|---|
| 3,877,988 | 4/1975 | Dey et al. ......................... | 429/194 |
| 4,125,687 | 11/1978 | Di Salvo, Jr. ..................... | 429/194 |
| 4,136,233 | 1/1979 | Eisenberg ........................ | 429/197 X |
| 4,143,213 | 3/1979 | Jacobson et al. ................. | 429/194 |

*Primary Examiner*—J. L. Barr
*Attorney, Agent, or Firm*—Kenyon & Kenyon

[57] ABSTRACT

An electric cell with a non-aqueous electrolyte. The cell includes a positive electrode whose active material is suitable for inserting the negative active material dynamically, a negative electrode whose active material includes at least one alkali metal, and an electrolyte, wherein said positive electrode includes at least one compound whose general formula is $MX_4R_nT_p$, where M represents an element chosen from among silicon, germanium, tin and lead, X represents sulphur, selenium or tellurium, R and T represent an element chosen from among copper, silver, manganese, iron, cobalt, and nickel, n being greater than or equal to 0 and less than or equal to 4, p being greater than or equal to 0 and less than or equal to 2. The invention is used in connection with button type electric cells.

2 Claims, 2 Drawing Figures

ELECTRONIC CELL WITH A NON-AQUEOUS ELECTROLYTE

This is a division of application Ser. No. 175,327 filed on Aug. 4, 1980.

The present invention relates to an electric cell with a non-aqueous electrolyte, in particular a rechargeable cell.

BACKGROUND

Electric cells are known in which the positive electrode includes a compound here referred to as an insertion or intercalation compound in which the negative active material is inserted during discharge, said negative active material generally being an alkali metal. Such compounds are, for example chalcogenides such as titanium sulphides or nickel phosphosulphide, mixed sulphides e.g. of bismuth or of lead or of copper, or oxyhalides of transition metals, e.g. FeOCl.

Such electric cells may undergo a high number of charge-discharge cycles and they are also suitable for delivering a high energy density. With a view to improving further the performances of electric cells of this type, the Applicant has therefore sought compounds which can be used as active material for the positive electrode.

The Applicant has observed that some compounds which have a thiospinel or olivine structure are particularly adequate for dynamically intercalating the negative active material and for enabling the realization electric cells which are rechargeable and have excellent performance.

Such an electric cell may be manufactured optionally either in the charged or in the discharged state.

THE INVENTION

The invention therefore provides an electric cell of the type which includes a positive electrode whose active material is suitable for inserting the negative active material dynamically, a negative electrode whose active material includes at least one alkali metal, and a non-aqueous electrolyte, wherein said positive electrode includes at least one compound whose general formula is $MX_4R_nT_p$, where M represents an element chosen from among silicon, germanium, tin and lead, X represents sulphur, selenium or tellurium, R and T represent an element chosen from among copper, silver, manganese, iron, cobalt and nickel, n being greater than or equal to 0 and less than or equal to 4, p being greater than or equal to 0 and less than or equal to 2.

By way of a non-limiting example, the preferred compounds are the following:

$Fe_2SiS_4$, $Fe_2GeS_4$, $Cu_2Fe_2SnS_4$, $Fe_2SnS_4$, $Cu_2MnSnS_4$, $Cu_4SnS_4$.

The electrode may also include a mixture of said compounds.

Such a compound may be used either alone, if it is a sufficiently good electronic conductor, or, in the contrary case, deposited on a conductive support or mixed with electronically conductive powders such as carbon or graphite.

The method of manufacturing such compounds is as follows:

The materials are prepared from pure powdered elements mixed in stoichiometric proportions and placed in silica phials sealed under vacuum.

After a rise in temperature of 50° C. per day, the phials are kept at 750° C. for a week, then cooled at a rate of 50° C. per day until they reach ambient temperature.

When the electric cell is assembled in the charged state, the active materials are inserted in the electric cell in the form obtained by the method described hereinabove. When the electric cell is assembled in the discharged state, the active material of the negative electrode is previously inserted in the positive active material, e.g. by the known technique which consists in putting the compound in contact with an organo-alkali such as butyl-lithium for 24 hours in a closed chamber which has a lower water content. The advantage of such a method with respect to that of assembling in the charged state resides in the fact that such insertion is more stable in atmospheric conditions than the negative active material alone which includes an alkali metal, thus avoiding the subsequent necessity of using a method of manufacture in an atmosphere with a very low water and oxygen content. However, such a process, which uses known techniques with butyl-lithium or in a solution in liquid ammonia, must be carried out in a controlled atmosphere.

The active material of the negative electrode includes at least one alkali metal.

Such a negative active material can be used pure or dispersed in a substance such that said element may subsequently be ionized.

Said metal may be in the form of an alloy, in particular an aluminum alloy.

In the case of assembly in the charged state, the negative active material can be deposited on a conductive support made, for example, of copper or nickel, by any appropriate technique.

When the electric cell is assembled in the discharged state, it is sufficient to dispose a collector therein which is constituted by a support made, for example, of copper, iron or nickel, said support being inert in the medium. The first time the electric cell is charged, the metal which has previously been inserted in the positive active material will be deposited on the negative collector.

The electrolyte may include a compound either in the pure state or in a solution in a suitable solvent.

As a general rule, the ionic carrier of said electrolyte is the cation of the element which constitutes the negative active material, the anion being a halide, a sulphate, a nitrate, a perchlorate, a phosphohalide or the like.

By way of example, the electrolyte is $LiPF_6$, $LiClO_4$ or LiI.

Propylene carbonate, dioxolane, dimethoxyethane, nitromethane, tetrahydrofurane and generally, ethers and cyclic esters may be mentioned as suitable solvents.

Of course, the concentration of the electrolyte is predetermined as a function of its conductivity and of its reactivity.

BRIEF DESCRIPTION OF THE DRAWING

Other characteristics and advantages of the invention will become apparent from the following description given by way of a purely illustrating example having no limiting character, with reference to the accompanying drawing, in which:

FIG. 1 illustrates a practical way of realizing an electric cell in accordance with the invention. The dimensions and in particular the thickness of the various components have purposely been exaggerated.

Figure 1:
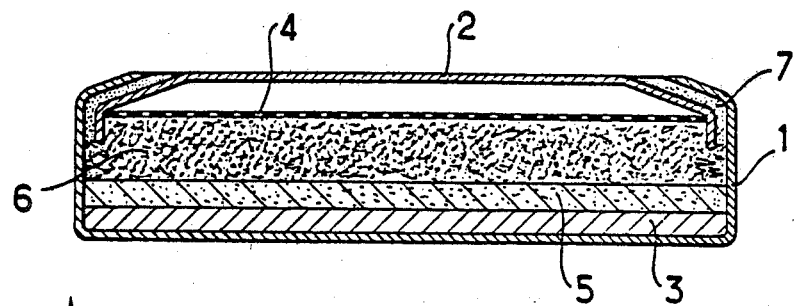
FIG. 1 illustrates an electric cell in accordance with the invention.

Reference 1 designates an outer casing in which an inner casing 2 can be press fitted. A spacer 3 is disposed in the bottom of the casing 1. A grid 4 which acts as the negative collector and on which lithium is disposed is installed at the upper portion of the casing 2. The casings, the grid and the distance piece are made of stainless steel, for example.

A first layer 5 of positive active material, separated from the negative electrode 4 by a separator 6 impregnated with the electrolyte, is disposed on the spacer piece 3.

Lastly, a polyethylene seal 7 seals the assembly.

In the following examples, the active material is crushed after manufacture and is disposed on the spacer piece 3 in the casing 6 in such a way that its mass is about 0.200 g. Said material is then compressed slowly to a force of 1000 kg. The volume of the casing is about 0.25 cm$^3$. Tests have also been carried out in accordance with two other technologies which consist, firstly, in using a spray gun to deposit a small mass of positive active material, i.e. about 0.20 g, on the spacer piece, said positive active material being in suspension in a teflon emulsion, and secondly, in manufacturing the positive electrode as follows:

The finely powdered active material is dispersed in an emulsion of polytetrafluoroethylene (PTFE) or of any other substance such as a fluorinated copolymer of ethylene and of propylene, in proportions by weight of 85 to 95% of active material for 15 to 5% of PTFE. Graphite or acetylene black is then added to increase electronic conductivity.

The emulsion is then precipitated with alcohol so as to form a consolidated mass which is pressed into a nickel or copper grid. A gel may also be formed, e.g. by dissolution of polyvinyl formal in a solvent such as propylene carbonate. The active material is then added to the gel formed.

By way of example, in one embodiment, the compound whose formula is Fe$_2$SnS$_4$ was prepared in accordance with the previously described method. After crushing, graphite with a grain size of 2 microns and acetylene black are added to the substance in proportions of 30% and 10% by weight respectively. The grain size of the powder thus obtained is 30 microns. The powder is used to produce a button-type electric cell as previously described.

Figure 2:
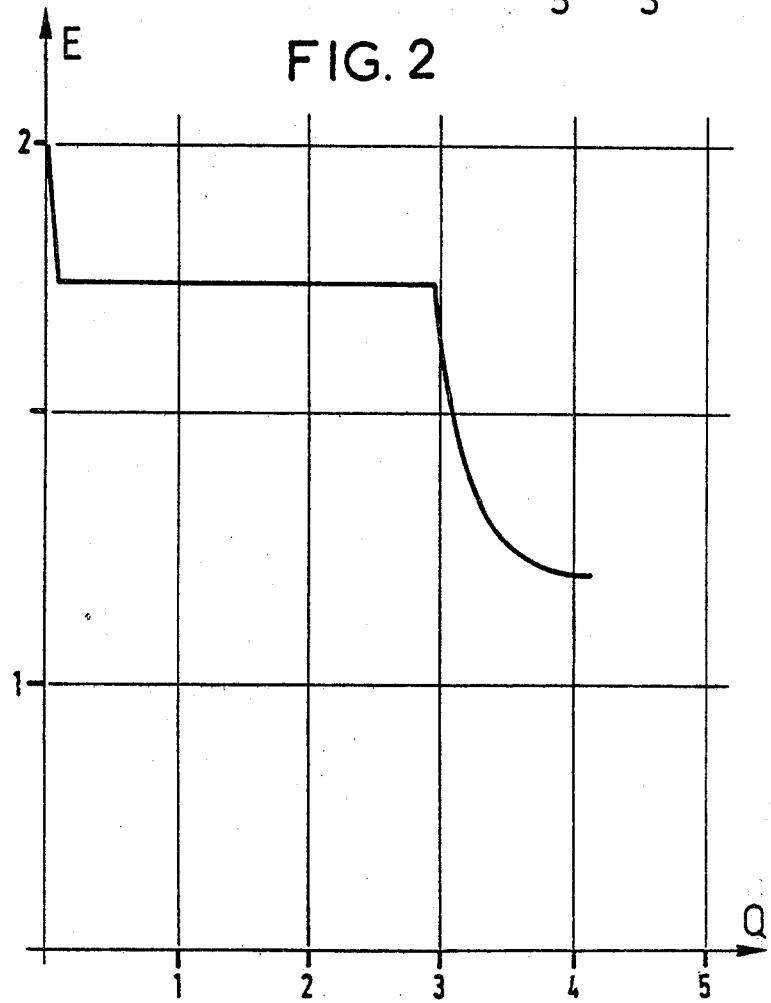
FIG. 2 illustrates the electrochemical characteristics of electric cells in accordance with the invention.

FIG. 2 shows the discharge curve of such an electric cell at a current of 40 microamps. More exactly, said curve indicates the variation in the electromotive force E in volts as a function of the quantity of electricity Q expressed in faradays per mole of positive active material. Similar electric cells have been made, but using the previously listed compounds as positive active materials.

The invention is used in connection with button-type electric cells.

We claim:

1. A method of manufacturing a positive electrode for an electric cell having a negative electrode, whose active material includes an alkali metal, and an electrolyte, said positive electrode including at least one compound chosen from the group consisting of Fe$_2$SiS$_4$, Fe$_2$GeS$_4$, Cu$_2$Fe$_2$SnS$_4$, Fe$_2$SnS$_4$, Cu$_2$MnSnS$_4$, Cu$_4$SnS$_4$ and mixtures thereof, wherein the method comprises, in sequence:

preparing said compound in powdered form;

dispersing said powdered compound in a polytetrafluoroethylene emulsion in the proportion of 15 to 5% of emulsion for 85 to 95% of powdered compound, by weight, adding alcohol to the dispersion of powdered compound in the emulsion to form a consolidated compound; and compressing said consolidated compound onto a conductive support.

2. A method of manufacturing a positive electrode for an electric cell having a negative electrode, whose active material includes an alkali metal, and an electrolyte, said positive electrode including at least one compound chosen from the group consisting of Fe$_2$SiS$_4$, Fe$_2$GeS$_4$, Cu$_2$Fe$_2$SnS$_4$, Fe$_2$SnS$_4$, Cu$_2$MnSnS$_4$, Cu$_4$SnS$_4$ and mixtures thereof, wherein the method comprises:

preparing said compound in powdered form;

dissolving polyvinyl formal in propylene carbonate to form a gel; and mixing the powdered compound with said gel.

* * * * *